UNITED STATES PATENT OFFICE.

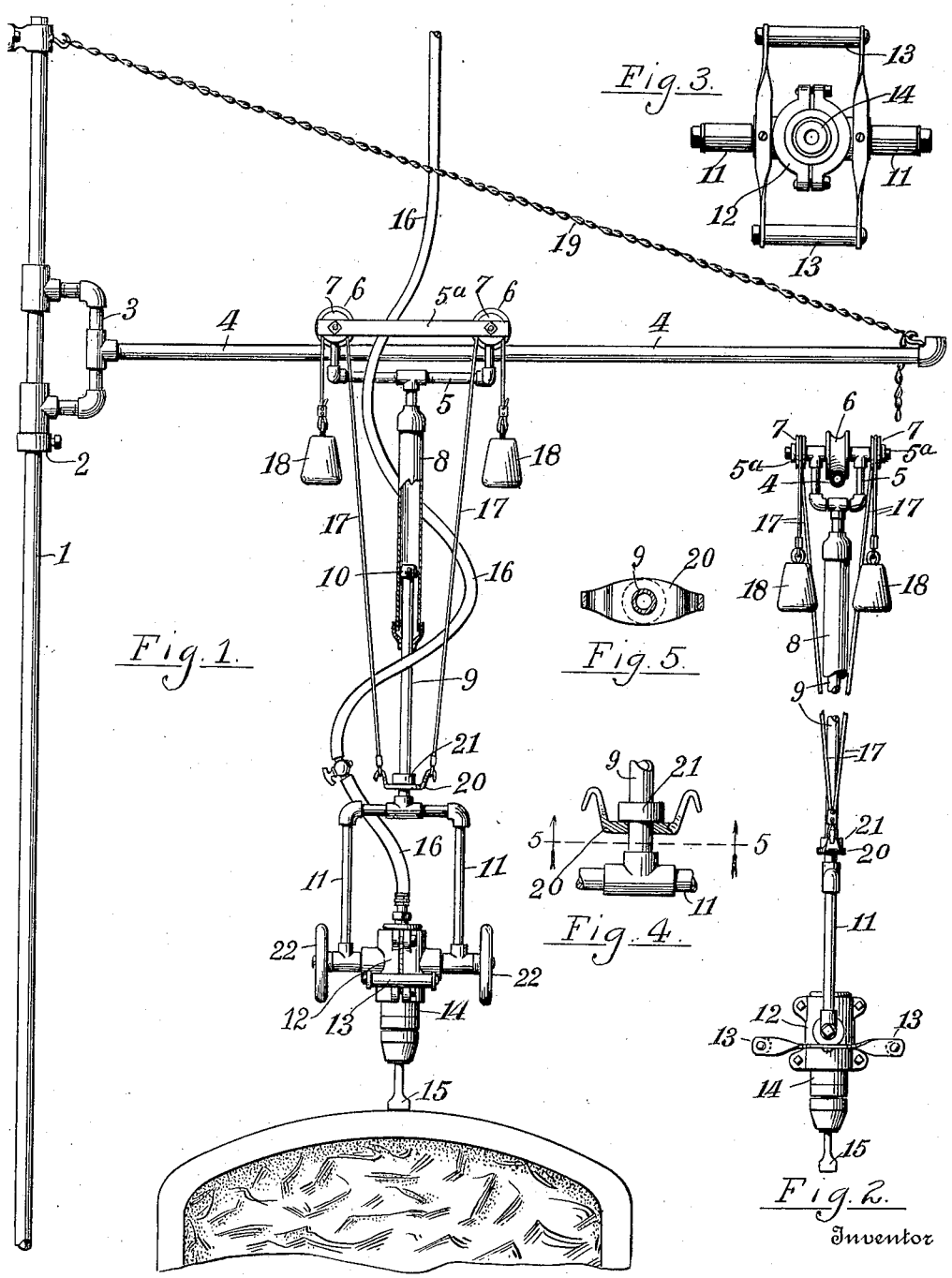

LEONARD MUSTE, OF GRAND RAPIDS, MICHIGAN.

STONEWORKING-MACHINE.

1,091,949. Specification of Letters Patent. Patented Mar. 31, 1914.

Application filed June 7, 1912. Serial No. 702,289.

*To all whom it may concern:*

Be it known that I, LEONARD MUSTE, a citizen of the United States of America, residing at Grand Rapids, in the county of Kent and State of Michigan, have invented certain new and useful Improvements in Stoneworking-Machines; and I do hereby declare the following to be a full, clear, and exact description of the invention, such as will enable others skilled in the art to which it appertains to make and use the same.

My invention relates to improvements in stone working machines and its object is to simplify the construction, to provide a machine that will apply a tool to the stone at various angles and in various positions, and to provide the device with certain new and useful features hereinafter more fully described and particularly pointed out in the claims reference being had to the accompanying drawings, in which:—

Figure 1 is a side elevation of a device embodying my invention with a portion broken away to show the construction; Fig. 2 a front elevation of a portion of the same shown at right angles to Fig. 1; Fig. 3 an enlarged detail in inverted plan view showing the arrangement of the handles for applying and adjusting the tool; Fig. 4 a side elevation partially broken away of the supporting plate and adjacent parts on an enlarged scale; and Fig. 5 a plan view of the same.

Like numbers refer to like parts in all of the figures.

The frame work of this device is preferably made mainly of ordinary pipe and pipe fittings. A vertically disposed post 1 is provided of suitable size and dimension and securely supported in any convenient manner. On this post is a vertically adjustable collar 2. Resting upon this collar and vertically adjusted thereby is a suitable yoke or frame 3 rotative on the post 1 and carrying a horizontal arm 4 which arm is thus adapted to swing freely about the axis of the post 1 in a horizontal plane and can be vertically adjusted by adjusting the collar.

A chain 19 is secured near the upper end of the post, at one end, and adjustably connected to the outer end of the arm 4 whereby the arm is securely supported in a horizontal position, and permitted to swing about the axis of the post. Freely traversing on this arm 4 is a carriage consisting of two yokes embracing the arm 4 and connected by a horizontal middle member 5 below the arm, and provided with grooved rollers 6 journaled in the yokes and adapted to traverse the arm. The yokes are also preferably connected by stay plates 5ª thus forming a substantial carriage to support the motor and tool.

A telescopic guide arm is provided to carry and guide the tool and operating motor as follows: Extending rigidly downward from the connecting member 5 is a pipe 8 forming a cylinder having reducers at its respective ends. Inserted in this cylinder and longitudinally movable therein is a vertically slidable member formed of a pipe or rod 9 having a collar 10 on its upper end to prevent withdrawal from the cylinder and also to serve to guide the same axially within the pipe 8 as it moves vertically therein. On the lower end of the pipe 9 is a yoke 11 in the arms of which is journaled on a horizontal axis a clamp 12 to engage and carry a pneumatic motor 14 to operate a suitable cutting tool 15 to engage and carve a stone as occasion may require. 22 are clamping wheels screwed upon the trunnions of the clamp whereby it can be fixed in the yoke at pleasure while operating the tool. The tool is thus carried on the lower end of a rigid telescopic guide arm which swings about the axis of the pipe 4, and the tool can be fixed at any angular relation to said guide arm. The pipe 9 is provided with a collar 21 and extends through a supporting plate 20 upon which the collar rests. This pipe 9 is rotative as well as longitudinally movable in the pipe 8 and the plate is supported by cords or cables 17 attached at one end to hooks on the said plate and extending thence upward over grooved pulleys 7 on the carriage and provided at their opposite ends with weights 18 to counterbalance the parts supported by the cords or cables 17. The clamp 12 is provided with a pair of oppositely projecting handles 13 whereby the clamp and parts carried thereby can be manually controlled to adjust and bring the tool 15 in contact with the work. In some cases it will be found convenient to omit the wheels 22 as in Fig. 2 and manually adjust the tool and motor about the axis of the trunnions of the motor. The clamp being pivoted on a horizontal axis and carried by the pipe 9 which is both vertically and rotatively adjustable in the cylinder, it will be seen that the tool can be applied to the work either vertically, horizontally or at any convenient angle of inclination either downward or upward from the horizontal. Suitable air conducting hose 16 is provided to operate the pneumatic motor, which hose preferably extends upward from the motor and thence to any convenient source of compressed air supply.

By the construction shown I am able to provide a light, strong, and cheap device for handling a pneumatically operated tool for working stone, freely adjustable in all directions, and at all angles whereby the tool may be manually applied in every convenient direction without the necessity of shifting the position of the stone.

What I claim is:—

1. In a stone working machine, the following parts made of pipe and pipe fittings, to wit:—a fixed post, a yoke slidable and rotative on the post, an arm carried by the yoke and adapted to swing in a horizontal plane, a carriage traversing the arm and comprising two yokes with a connecting member made of pipe and fittings, a member suspended from the connecting member of said two yokes and consisting of a larger pipe carried by said connecting member and a smaller pipe telescoping with the same and provided with a collar at its upper end and vertically slidable in the larger pipe, a yoke carried by the last named pipe and adapted to carry a pneumatic engine and pivotally support the same, and means for counterbalancing the suspended member and the parts carried thereby.

2. In a stone working machine, a supporting means, a carriage movable horizontally on the supporting means, a member suspended from the carriage and consisting of a larger pipe connected to the carriage and a smaller pipe telescoping within the larger pipe and near its lower end provided with a collar, the smaller pipe being rotative and slidable in the larger pipe, a yoke connected to the smaller pipe, an engine carried by said yoke, a cutting tool operated by the engine, and means for counterbalancing the smaller pipe and the parts carried thereby.

3. In a stone working machine, a supporting means, a carriage horizontally movable on said supporting means and provided with pulleys, a member suspended from the carriage and comprising a rigid tubular member and a member telescoping within the rigid tubular member, an engine carried by the member which telescopes within the fixed tubular member, a cutting tool operated by the engine, and connections between the member which telescopes within the tubular member and operable over the pulleys of the carriage to counterbalance the member which telescopes within the tubular member and the parts carried thereby.

4. In a stone working machine, a supporting means, a carriage horizontally movable on the supporting means and provided with pulleys, a rigid tubular member suspended from the carriage, a member slidable within the tubular member, a collar on the member which slides within the tubular member, a plate on the member which slides within the tubular member and arranged beneath said collar, an engine carried by the member which slides within the tubular member, a cutting tool operated by the engine, cables connected to said plate and extending over the pulleys of the carriage, and weights connected to the free ends of the cables.

5. In a stone working machine, a supporting means, a carriage, movable horizontally on the supporting means, a member suspended from the carriage and consisting of telescoping members one of which is fixed and the other of which is movable within the fixed one, the carriage carrying pulleys, an engine supported by the movable telescoping member, a cutting tool operated by the engine, cables having connection with the telescoping member and which pass over the pulleys on the carriage, and weights having connection with the free ends of said cables.

In testimony whereof I affix my signature in presence of two witnesses.

LEONARD MUSTE.

Witnesses:
HAROLD O. VAN ANTWERP,
LUTHER V. MOULTON.

---

Copies of this patent may be obtained for five cents each, by addressing the "Commissioner of Patents, Washington, D. C."